(12) United States Patent
Burns

(10) Patent No.: US 11,416,478 B2
(45) Date of Patent: Aug. 16, 2022

(54) DATA STRUCTURE AND FORMAT FOR EFFICIENT STORAGE OR TRANSMISSION OF OBJECTS

(71) Applicant: Live Earth, LLC, Austin, TX (US)

(72) Inventor: Zachary Burns, Austin, TX (US)

(73) Assignee: LIVE EARTH, LLC, Austin, TX (US)

( * ) Notice: Subject to any disclaimer, the term of this patent is extended or adjusted under 35 U.S.C. 154(b) by 91 days.

(21) Appl. No.: 16/737,588

(22) Filed: Jan. 8, 2020

(65) Prior Publication Data
US 2020/0218713 A1    Jul. 9, 2020

Related U.S. Application Data

(60) Provisional application No. 62/789,682, filed on Jan. 8, 2019.

(51) Int. Cl.
| | |
|---|---|
| *G06F 16/00* | (2019.01) |
| *G06F 16/23* | (2019.01) |
| *G06F 16/21* | (2019.01) |
| *G06F 16/22* | (2019.01) |

(52) U.S. Cl.
CPC ........ *G06F 16/2379* (2019.01); *G06F 16/211* (2019.01); *G06F 16/2228* (2019.01)

(58) Field of Classification Search
CPC ............... G06F 16/211; G06F 16/2379; G06F 16/2228; G06F 16/258; G06F 16/86; G06F 16/8358; G06F 16/29; G06F 16/9537

USPC ......................................................... 707/752
See application file for complete search history.

(56) References Cited

U.S. PATENT DOCUMENTS

| | | | |
|---|---|---|---|
| 7,386,836 B2* | 6/2008 | Fox ...................... | G06F 9/4493 717/120 |
| 10,042,862 B2* | 8/2018 | Gorman .............. | G06F 16/9537 |
| 2004/0250239 A1* | 12/2004 | Fox ....................... | G06F 9/4493 717/116 |
| 2006/0036935 A1* | 2/2006 | Warner .................. | G06F 16/86 715/203 |
| 2008/0294678 A1* | 11/2008 | Gorman ................. | G06F 16/29 707/999.102 |
| 2009/0064206 A1* | 3/2009 | Olderdissen ............ | G06F 9/547 719/330 |
| 2018/0262533 A1* | 9/2018 | McCaig ............... | H04L 63/1408 |
| 2019/0357013 A1* | 11/2019 | Mirbaha ............... | G06F 16/182 |

* cited by examiner

*Primary Examiner* — Vincent F Boccio
(74) *Attorney, Agent, or Firm* — Sprinkle IP Law Group

(57) ABSTRACT

Data structures for the transmission or storage of records and the efficient serialization and deserialization of such records are disclosed. Embodiments of such a data structure offer a large and flexible data structure and format that may include an object format and a stream format. These data structures may be a packed sequence that may include fields of varying types and encodings with an order determined by the schema of a particular type of record being serialized.

18 Claims, 7 Drawing Sheets

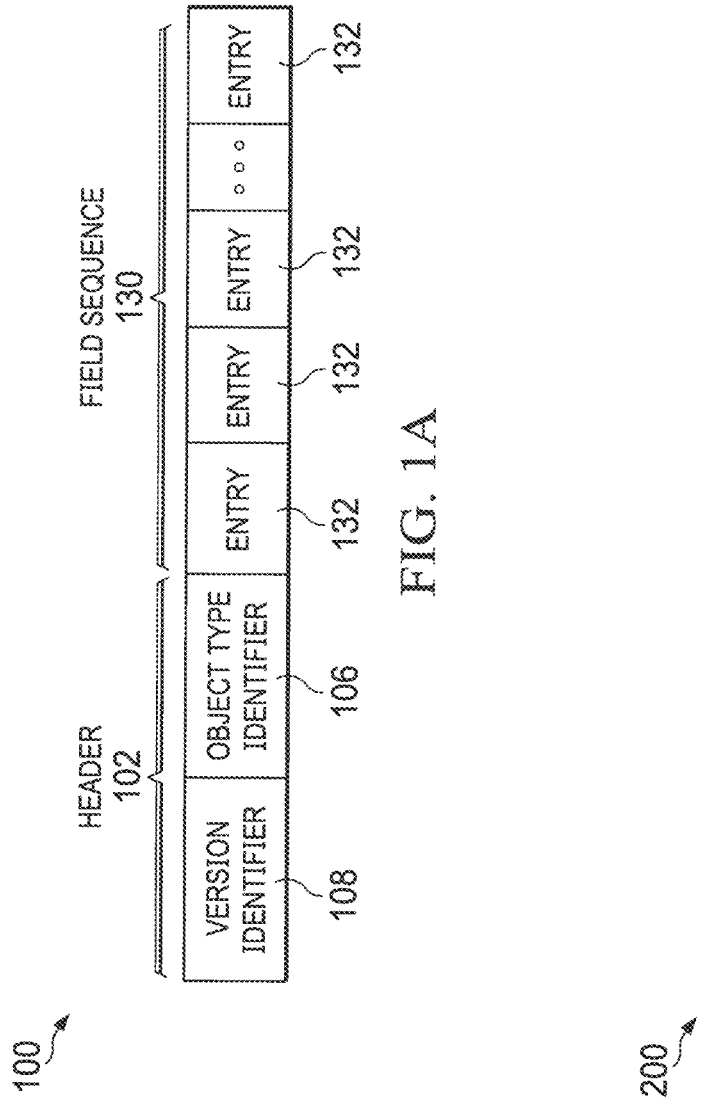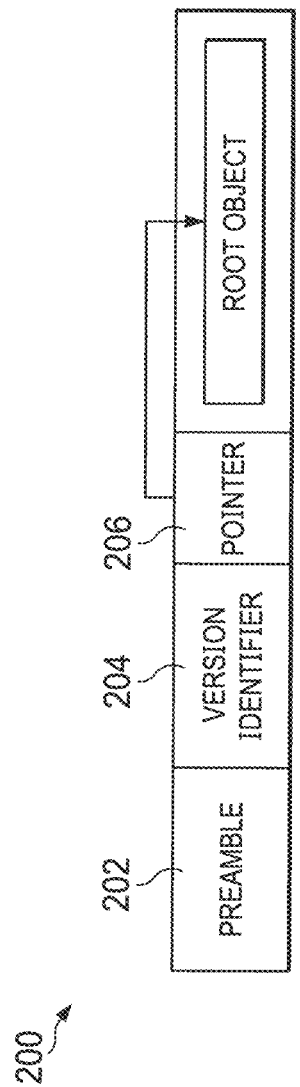

DATA STRUCTURE AND FORMAT FOR EFFICIENT STORAGE OR TRANSMISSION OF OBJECTS

RELATED APPLICATIONS

This application claims a benefit of priority under 35 U.S.C. 119 to U.S. Provisional Patent Application Ser. No. 62/789,682 filed Jan. 8, 2019, entitled "DATA STRUCTURE AND FORMAT FOR EFFICIENT STORAGE OR TRANSMISSION OF OBJECTS," by Burns, which is incorporated herein in its entirety by reference.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to a data formats for data storage, retrieval, distribution or transmission. In particular, this disclosure relates to compact data structure formats for the serialization or deserialization of records. Specifically, embodiments disclosed herein relate to a variable length binary format for the serialization and deserialization of records allowing for variable length object fields to reduce storage or transmission requirements while maintaining forward and backward compatibility.

BACKGROUND

In today's distributed computing environments, the need to send or store greater amounts of data is ever increasing. Further complicating these needs is the fact that the variety of data that may need to be sent is also increasing. To illustrate, a microcosm of these issues manifests in the area of geospatial information systems. Geospatial information systems are utilized for capturing, storing, analyzing or otherwise managing geographic data and associated attributes which are spatially referenced to the earth. This geospatial information can be gathered from multiple, disparate sources, and used to build a unified, coherent data store which is managed by a geospatial information provider. The geospatial information gathered in the data store can then be provided to various other entities that require geospatial information for their operation over a computer network. For example, geospatial information may be utilized by delivery companies, online map services that provide map information and routing information to end users, among many others.

These geospatial information systems may thus receive and process a large amount of geospatial event data, including geospatial location data. This data may be extremely rich, encompassing many different types of values of data, such as locations, headings, times, icons to use for representations, event information or a great deal of other types of data. Moreover, geospatial information systems may provide this geospatial event data (including this geospatial location data) over the computer network in response to a high volume of requests. As may be imagined, this type of rich data is not confined to geospatial information systems and a great deal of other computing systems have similar needs to transmit and store large amounts of rich data. In particular, these systems may have the need to take such rich data and store or transmit records representing this rich data among the various computers or applications comprising such systems.

Accordingly, when managing data (e.g., storing or transmitting such data) providers of computing systems are often forced to make difficult choices regarding storage and network bandwidth. These problems stem in no small part from the formats those systems may use to serialize or deserialize data for transmission or storage as many data structures or formats for the serialization of data records exhibit a number of problems having to do with, for example, required overhead, backward or forward compatibility, compressibility, or other issues.

What is needed, therefore are improved data structures or formats that may be used to serialize and deserialize data.

SUMMARY

To those ends, among others, embodiments as disclosed herein are directed to a data structure or format for the transmission or storage of records and, in particular, to the efficient serialization and deserialization of such records. Embodiments of such a data structure or format will be referred to herein as generally as the Live Buffer format or system for ease of reference without loss of generality. The Live Buffer system offers a large and flexible data structure and format. The Live Buffer format may include a Live Buffer object format and a Live Buffer stream format. The Live Buffer format may be usefully applied to the transformation of an array or list of data records with an identical schema into one or more Live Buffer objects having Live Buffer streams among other use cases for the Live Buffers system.

According to certain embodiments a Live Buffers object is a pointer to a buffer (e.g., a sequence of bytes, and the current offset to read or write from or to those bytes) comprising a byte length, followed by a series of values using heterogeneous encodings defined by a schema. A Live Buffers stream may be a series of homogeneous data encoded as a discriminated enum: a value (e.g., a Binary representation of some data) for the discriminant, followed by a value determined by the discriminant. The types of encoding may be: Null: the series is empty, no additional values; Const: all members of the sequence have the same value. The data is the one encoded value; Sequence: a pointer to a buffer of the series of values using homogeneous encodings or Table: a Sequence of unique values, and a Sequence of (e.g., non-unique) indices into the values indicating the order of occurrence in the sequence.

As embodiments of the data structures as disclosed may provide a structure and format to mix the grouping of data by record or by field, where the values for each field of a set of records may be sequentially packed into the stream, a number of advantages and technical improvements may be realized. Firstly, it enables more general constructions by allowing streams of streams, when streams themselves have no header. Such a format may also be part of enabling backward compatibility. Here, any application reading a version of a schema will know how many streams have been read in a packed sequence, and therefore can pull one byte every certain number of streams (e.g., four in one byte-aligned embodiment) as a pointer is advanced in the packed sequence without any other data being necessary to enable backward compatibility.

Additionally, certain embodiments may provide the capability of variable length objects or fields, a zero bit amortized schema overhead per record or field and full backward and forward compatibility. These advantages may result in significant improvements to the technical operation of computing systems which employ embodiments, including a reduction in the memory or storage requirements for such systems as fewer bytes may be needed to store data according to embodiments, and an increase in the speed of transmission of such data given the same amount of bandwidth (again, because fewer bytes may be needed to be transmitted). Specifically, as variable length encoding mechanisms may be used for values in a particular stream embodiments may allow for variable length fields in these streams and can take advantage of these types of variable length encodings to encode the values of fields using fewer bits, thereby using less disk space or network bandwidth.

Moreover, by utilizing an object to describe a list of records (e.g., data record) and grouping the fields of the described records into their own streams the cost of versioning information can be amortized across the list of records and removes the problem that variable length fields would interfere with the positions of fields of a different type within a single object. When an encoding is able to advance a pointer in the stream by the number of bits that a field of a known type takes, then it is possible to know where the next field of an record resides. In this manner, the header of the object including the object identifier and the version along with pointers to the start of each included stream may be sufficient to enable both forward and backward compatibility substantially regardless of the number of records included in the data structure.

Similarly, by employing an object and version identifier, along with the use of streams to serialize the values for the fields of the included record, embodiments may be both backward and forward compatible. Accordingly, as embodiments may be a serialization format that is backward compatible, older versions of software can be enabled to read data serialized by newer versions of the software even in the presence of additional fields in the schema of an object. Moreover, embodiment may also be forward compatible, allowing newer versions of software to read data serialized by older versions of the software.

In one embodiment, a data structure for serializing data from data records for a type of entity includes a header portion comprising a schema identifier for a schema for the type of entity, wherein the schema defines a number of fields for the type of the entity and an encoding of each of the fields, and a version identifier. The data structure may also include a field sequence portion, comprising an entry corresponding to each of the fields defined by the schema, each entry of the field sequence including serialized values from the data records for a corresponding one of the fields for the type entity. As such a first entry for a first field includes a first stream for the first field including first serialized values for the first field from the data records and a second entry for a second field includes a second stream for the second field including second serialized values for the second field from the data records.

In some embodiments, the first stream is encoded according to a first schema and the second stream is encoded according to a second schema.

In a particular embodiment, a first stream is one of a Table stream, a Null stream, a Sequence stream or a Const stream and the second stream is one of the Table stream, the Null stream, the Sequence stream or the Const stream.

In a specific embodiment, the field sequence portion includes a stream flag entry identifying a type of the first stream and a type of the second stream.

In one embodiment, the first stream includes a pointer to a relative address corresponding to the first serialized values.

In another embodiment, the schema identifier comprises a universally unique identifier (UUID) and a binary length of the data structure.

In still another embodiment, the field sequence portion includes a count of the number of data records included in the data structure.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 1A is a block diagram of one embodiment of a format for a data structure for the serialization or deserialization of records.

FIG. 2 is a block diagram of one embodiment of a message format for storing or transmitting embodiments of a data structure for the serialization or deserialization of records.

DETAILED DESCRIPTION

Figure 1B:
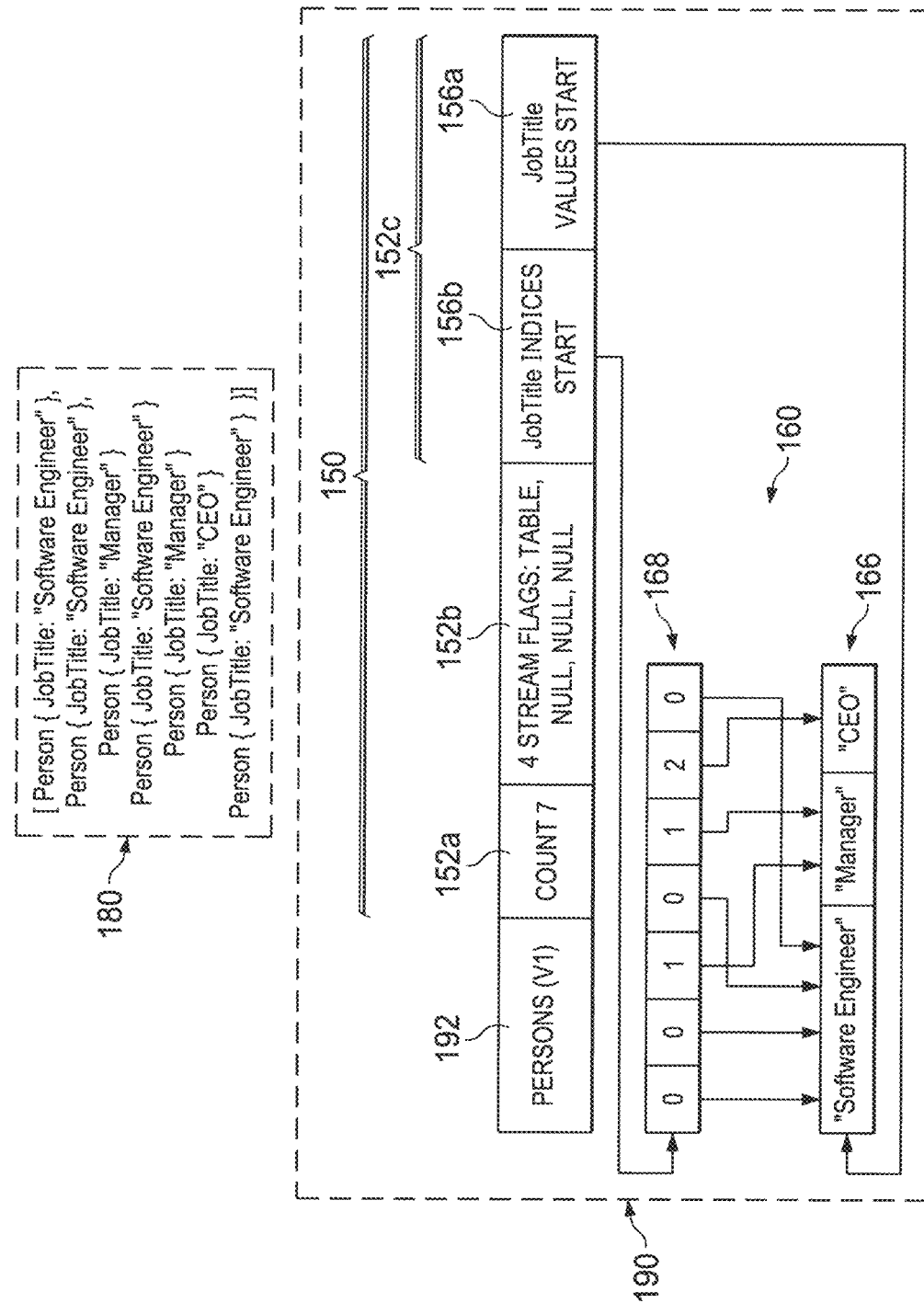
FIG. 1B is a diagrammatic representation of an example set of records and associated embodiment of an example data structure including a Table stream.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing specific embodiments, some additional context may be useful. As discussed, in today's distributed computing environments, the need to send greater amounts of data is ever increasing. Further complicating these needs is the fact that the variety of data that may need to be sent is also increasing. To illustrate, a microcosm of these issues manifests in the area of geospatial information systems. A geospatial information system provider may compile geospatial information and maintain a geospatial information system. The geospatial information can be gathered from multiple, disparate sources, and used to build a unified, coherent data store which is managed by the geospatial information provider. The geospatial information gathered in the data store can then be provided to various other entities that require geospatial information for their operation over a computer network. For example, geospatial information may be utilized by delivery companies, online map services that provide map information and routing information to end users, among many others.

Increasingly, entities are being connected electronically or communicatively in ways that previously were the province mostly of computers. As such, the term "Internet of Things" (IoT) has come to describe a dynamic network of globally connected things, entities, devices, items or objects (collectively entities). In fact, almost any device with a sensor of some type can be connected to a computer network or otherwise monitored. Thus, geospatial information systems may now obtain geospatial information data relating to weather monitors, traffic devices (e.g., air traffic, road traffic, marine traffic, etc.), devices for delivery fleets, devices related to lighting, parking, water flow for bodies of water or city utilities, seismographic data, computing device, video cameras, devices monitoring building status, or a whole host of other devices, systems or other entities. As can be seen, as the number and complexity of interconnected items in an IoT has grown exponentially, the tracking, monitoring and identification of these interconnected things becomes all the more challenging.

In particular, not only is it desired to track a large number of items, it is desired to track these items both historically and in real-time. Thus, in some cases a geospatial information system may receive hundreds of millions of geospatial data events (or more) from various information sources each day, where this geospatial event data may include geospatial location data. Moreover, that geospatial information system may provide this geospatial event data, including this geospatial location data in response to hundreds of thousands or millions of requests each day. As a result, millions or billions (or more) sets of geospatial location data may be stored and regularly updated at a geospatial information system, or provided over a computer network from the geospatial information system to entities that require such geospatial data.

This data may be extremely rich, encompassing many different types of values of data, such as locations, headings, times, icons to use for representations, event information or a great deal of other types of data. As may be imagined, this type of rich data is not confined to geospatial information systems and a great deal of other computing systems have similar needs to transmit and store large amounts of rich data. In particular, these systems may have the need to take such rich data and store or transmit records representing this rich data among the various computers or applications comprising such systems.

Serialization is a mechanism for taking data (e.g., data records) and formatting that data to a stream of data. During deserialization, the stream of data may be evaluated to obtain the original data. Such a serialization and deserialization process may be utilized, for example, to convert a data structure or set of data structures (e.g., a list of records) to a stream of data for transmission such that the receiver can deserialize the transmission to obtain the data or the original data structure. Serialization may thus facilitate inter-process communication or persistence such as storage on a non-volatile media.

A serialization format that is backward compatible enables older versions of software to read data serialized by newer versions of the software even in the presence of changes to the schema. This enables, for instance, new servers to be deployed without synchronizing updates to new versions of a client. A serialization format that is forward compatible allows newer versions of the software to read data serialized by older versions of the software. This enables, for example, data stored in a data stored to be read by new versions of the software without having to migrate the data in the database.

Many data structures or formats for the serialization of data records exhibit a number of problems. In the main, these problems result from the amount of overhead required, their lack of forward or backward compatibility, or the lack of ability to utilize variable length objects or fields. Some of these problems may be so severe that these data structures or formats may prove unusable in certain contexts. For example, JavaScript Object Notation (JSON) is an open-standard file format that uses human-readable text to serialize records consisting of attribute-value pairs. One example of JSON format for a person record is as follows:

```
{
    "firstName": "John",
    "lastName": "Smith",
    "isAlive": true,
    "age": 27,
    "address": {
        "streetAddress": "21 2nd Street",
        "city": "New York",
        "state": "NY",
        "postalCode": "10021-3100"
    },
    "phoneNumbers": [
        {
            "type": "home",
            "number": "212 555-1234"
        },
        {
            "type": "office",
            "number": "646 555-4567"
        },
        {
            "type": "mobile",
            "number": "123 456-7890"
        }
    ],
    "children": [ ],
    "spouse": null
}
```

As can be seen, JSON has a great deal of overhead. As but one example, the descriptive human-readable text (e.g., "firstName", "lastName", "age") will be transmitted with each person record even though the data included in the records themselves may exhibit little to no variance from record to record (e.g., every Person record may include a "firstName" field). In fact, the overhead for each record (e.g., number of bytes) may exceed the data required for the values of the fields themselves. Accordingly, the overhead of JSON may prove prohibitive to its use in certain types of computing systems, including, for example, real-time systems that utilize a large quantity of rich data.

Another example of a data serialization formats and structures are Protocol Buffers (protobuf). For protobuf, a developer defines a data structure which is used to generate code that can process the defined data structures. For example, a developer may define a structure for a person as follows:

```
message Person {
    required int32 id = 1 ;
    required string name = 2;
    optional string email = 3;
}
```

While overhead may be reduced using protobuf, it is not completely eliminated as protobuf encodes a field number and wire type for every field of every record, and this overhead may still be significant when serializing many records. Furthermore, the use of protobuf may come with certain issues of its own. While protobuf may allow for variable length fields this capability may be of a limited nature as it is constrained to a pre-determined set of wire types defined by the protocol.

As yet another example, an additional data serialization format is Flatbuffers. For Flatbuffers, a developer defines a data structure which is used to generate code that can process the defined data structures. For example, a developer may define a structure for a monster as follows:

```
struct Vec3 {
    x:float;
    y:float;
    z:float;
}
table Monster {
    pos:Vec3;
    mana:short = 150;
    hp:short = 100;
    name:string;
    friendly:bool = false (deprecated);
    inventory:[ubyte];
}
```

While overhead may be reduced using Flatbuffers (e.g., as compared to JSON), the use of Flatbuffers may come with certain issues of its own. When a developer writes a schema to generate the code for serializing a structure according to Flatbuffers, they must make a choice between using a struct or a table, each with its own set of tradeoffs. If the developer chooses a struct, the data will be written with no overhead for the schema, but that decision comes at the cost of both backward compatibility and variable length fields or records. That is to say, the developer may then never be able to add or remove any fields from the struct in the future without breaking backward compatibility, and all structs will be serialized with the same length—thereby removing any possibility of using compression techniques.

If, however, the developer chooses a table, additional overhead in the binary format is incurred in the form of a pointer to the table, as well as a pointer in the table to an entry in a vtable which stores its schema information, as well as the (de-duplicated) schema information in the vtable. This overhead is relatively small for a single table, but may accumulate to a significant amount when large files of many tables are serialized. The benefit gained at the cost of these overheads is variable length records (but still not variable length fields) and the ability to add or deprecate fields in the future in a way that does not break backward compatibility.

What is needed, therefore are language and platform neutral data structures or formats to serialize and deserialize records, where those data structures or formats have a compact format with reduced overhead that easily support backward and forward compatibility.

To those ends, among others, embodiments as disclosed herein are directed to a data structure or format for the transmission or storage of records and, in particular, to the efficient serialization and deserialization of such records. Embodiments of such a data structure or format will be referred to herein as generally as the Live Buffer format or system for ease of reference without loss of generality. The Live Buffer system offers a large and flexible data structure and format. The Live Buffer format may include a Live Buffer object format and a Live Buffer stream format and while the Live Buffer format may be usefully applied to the transformation of an array or list of data records with an identical schema into one or more Live Buffer objects having Live Buffer streams, this is but one use case for the Live Buffers system. It will be understood that there may be a large number of other uses for the Live Buffer system and such uses are fully contemplated.

As will be used herein, the term packed sequence is used to mean a series of encoded fields laid out sequentially. In some embodiments, there may be no padding or protocol overhead for such packed sequences. A Live Buffer object may thus be a packed sequence that may include fields of varying types and encodings with an order determined by the schema of that particular type of Live Buffer object. A Live Buffer stream is a packed sequence of (encoded) fields having the same encoding (and which may further be described by its associated type—Null, Const, Table, or Sequence as will be discussed in more detail at a later point herein).

Accordingly, for a Live Buffer object, the schema, or type, of the Live Buffer object can be specified in one or more fields, termed a header. The version or length (e.g., byte count) of a Live Buffer object may also be specified in the header. The other fields of a Live Buffer object may be values in binary form and may include a custom encoding; a pointer to, or an inlined, Live Buffer stream (e.g., including flags to determine a type of the stream); or a pointer to (or inlined) another (or the same) Live Buffer object. A custom encoding used for a field of a Live Buffer object may be supplied, for example, by an application utilizing that type of Live Buffer object (e.g., which may be either of fixed or variable length data). Specifically, in certain embodiments, the header portion of a Live Buffer object may include an identifier (e.g., a universally unique identifier (UUID) or the like) for a type or schema of the object (e.g., the schema defining the types of fields, of the) and a version identifier for the object. The header may also include a length or object count of how many data records are included in the Live Buffer object.

It is important to note here that any time a pointer is referenced herein it will be understood that inlining may be equivalently used without loss of generality. This is made possible at least by the fact that objects as discussed herein may be length or version prefixed, and that the contextual nature of streams ensures that a decoder always knows how many values to pull off of an object or stream.

In some embodiments then, neither the types of Live Buffer streams, nor the Live Buffer streams themselves are a part of the Live Buffer object header. The types of Live Buffer streams, as well as the Live Buffer streams themselves (or pointers to them) are part of any 'packed sequence' (which can be a part of the data portion of either a Live Buffer object, or a Live Buffer stream). The format of embodiments of the Live Buffer system may allow certain advantages. Firstly, it enables more general constructions using the Live Buffer system (by allowing streams of streams, when streams themselves have no header). Such a format may also be part of enabling backward compatibility. If the type of a Live Buffer stream was in the header instead of a part of the packed sequence, there would need to be a mechanism for knowing where the end of the header starts, since adding a new stream would change the size of the header. Here, any application reading a version of a schema will know how many streams have been read in a packed sequence, and therefore can pull one byte every four streams (in one byte-aligned embodiment) as the pointer is advanced in the packed sequence without any other data being necessary to enable backward compatibility.

It should be understood that while embodiments as described may include descriptions of length or count or version identifiers, these are but examples of data that may be included in the Live Buffer system to achieve forward compatibility, and that either of these alternatives may be utilized in different embodiments and other alternatives altogether may be utilized in other embodiments. To illustrate further, a Live Buffer system can achieve forward compatibility using a version number in the header (e.g., which would allow a determination of how many fields an record has) or length in the header (e.g., which may be used in conjunction with the schema to pull fields until the end is reached). In some embodiments, having the length in the header may be utilized, because including such a length enables embedding objects as fields, or having objects inlined in streams that are still skippable in the presence of unknown data, without requiring a pointer for indirection.

Objects formatted according to the Live Buffers format may be stored or transmitted according to a message format that includes a preamble identifying the message as being in the Live Buffer format, an identification of the version of the Live Buffer format, and a relative pointer to the root object (e.g., root Live Buffer object) of the message.

As embodiments of the Live Buffer format may provide a structure and format to mix the grouping of data by record or by field, where the values for each field of a set of records may be sequentially packed into the stream, a number of advantages and technical improvements may be realized. In fact, certain embodiments may provide the capability of variable length records or fields, a zero bit amortized schema overhead per record or field (e.g., the number of overhead bits does not vary with the number of data records included in the Live Buffer object), and full backward and forward compatibility. These advantages may result in significant improvements to the technical operation of computing systems which employ the Live Buffer format, including a reduction in the memory or storage requirements for such systems as fewer bytes may be needed to store data in a Live Buffer format, and an increase in the speed of transmission of such data in the Live Buffer format given the same amount of bandwidth (again, because fewer bytes may be needed to be transmitted). Here, as in other places in the description, the term "fewer bytes" has been used, however it will be noted that this term may generally understood to mean fewer bits and the terms may be understood interchangeably. While in most current computer architectures, it is often more efficient if the encodings are byte-aligned, saving bits is generally possible for some kinds of encodings even when byte-alignment is not utilized or achieved.

With reference to variable length encoding, there are many existing encodings of primitive data which relate frequency of occurrence of data with the size of that data, thereby making the total size of the serialized data smaller. Common examples of variable-width encodings include, but are not limited to: UTF-8, a variable-width character encoding that uses between one and four bytes per code point, using only one byte for all characters in the English language; Varint, a variable length encoding of integers that encodes smaller integers using fewer bytes than larger integers by using a tag bit to extend the length of an encoded integer; and Huffman coding, an optimal prefix code which uses a variable number of bits based on an estimated probability of the occurrence of a source symbol.

As a Live Buffer system may utilize a stream to serialize values of a field across a list of included records, all the values for that field for each record may be encoded in the same manner in the same stream. This feature allows variable length encoding mechanisms to be used for values in a particular stream. Use of embodiments of the Live Buffer system therefore allows for variable length fields in these streams and can take advantage of these types of variable length encodings to encode the values of fields using fewer bits, thereby using less disk space or network bandwidth.

As regards the advantage of a zero bit amortized schema, in most cases a serialization format that supports backward compatibility must have method of 'skipping over' fields that it does not recognize serialized by future versions of the software. Existing solutions to this problem use bits to write either information about the encoding or length information so that an old version of the software can find the beginning of the next record. These bits signaling how to find the beginning of records add to the overall size of the serialized data, contributing to additional cost in storage or network bandwidth.

According to embodiments of a Live Buffer system, however, by utilizing an object to describe a list of records and grouping the fields of the described records into their own streams the cost of versioning information can be amortized across the list of all records and removed the problem that variable length fields would interfere with the positions of fields of a different type within a single record. When an encoding is able to advance a pointer in the stream by the number of bits that a field of a known type takes, then it is possible to know where the next field of an record resides. In this manner, the header of the Live Buffer object including the object identifier and the version along with pointers to the start of each included stream may be sufficient to enable both forward and backward compatibility substantially regardless of the number of fields included in the Live Buffer object. Accordingly, additional objects may be added to a Live Buffer object without utilizing additional bits of overhead, reducing the use of memory or storage required for the Live Buffer system and the network bandwidth required to transmit such data.

Similarly, by employing an object and version identifier, along with the use of streams to serialize the values for the fields of the included record, embodiments of the Live Buffer system may be both backward and forward compatible. Accordingly, as the Live Buffer system may be a serialization format that is backward compatible, older versions of software can be enabled to read data serialized by newer versions of the software even in the presence of additional fields in the schema of an object. This capability, in turn, enables, for instance, new servers to be deployed without synchronizing updates to new versions of a client. Moreover, embodiments of the Live Buffer system may also be forward compatible, allowing newer versions of software to read data serialized by older versions of the software. This enables, for instance, data stored in a data store to be read by new versions of the software without having to migrate the data in the data store (e.g., to the newer version of the schema, record or object).

Moreover, since a pointer to a Live Buffers object, or an inlined Live Buffers object can exist in a field and therefore any packed sequence, a Live Buffers object can contain or reference other Live Buffer objects, and a Live Buffer stream can contain or reference other Live Buffers objects—allowing for rich object nesting or graphs when desired. It is also possible to create Live Buffers streams of Live Buffers objects, Live Buffers streams of Live Buffers streams, and the like.

As another advantage, as embodiments of the Live Buffer system may provide a format by which similar data can be grouped together in certain types of streams, it becomes easier for general purpose compression algorithms to find efficiency gains when compressing such data. By way of example, run length encoding (RLE) is a very simple lossless compression method that encodes data in runs (sequences of identical values are encoded as a pair of data and the count of occurrences of that data). When using the Live Buffer system to group fields of records of an identical schema, many data sets will be transformed in such a way that there are fewer runs that are longer, rather than many short runs, leading to more efficiencies gained when using run length encoding.

Similarly, the Lempel-Ziv family of compression algorithms (LZ77, LZ78 and others) use a "sliding window" to view a portion of the data being compressed at a time. By grouping similar fields together, many data sets will have more similarities within the sliding window then had the data for each value of an record's fields been interspersed throughout the data. By writing data with a two-pass approach that first writes data using an embodiment of the Live Buffer system, and then further compressing the result with a general purpose compression technique such as RLE, LZ78, Huffman coding, bzip2 or others, greater efficiency gains may be realized.

With reference now to FIG. 1A, a block diagram of on embodiment of a Live Buffer format is depicted. Embodiments of the Live Buffer format may provide a way to mix or group data by record or by field. Typically, grouping by record is used to provide an overall structure and grouping by field is used to pack data for the fields of included records without padding, Live Buffers uses 'object layout' (or 'record layout) to describe fields grouped per-record and 'stream layout' to describe records grouped by field.

A Live Buffer object may be an object or record type or schema identifier followed by a series of packed fields. The number of fields in the Live Buffer and the method of encoding them is identified by the Object's schema. In particular, a Live Buffer object 100 includes a header portion 102 that includes an identifier 106 for a type or schema of the record (e.g., a UUID or the like) and a version identifier 108 for the object. The schema for a record may include a set of data fields that the record may adhere to or include. The Live Buffer object 100 may, in certain embodiments, also include a field having a length or count identifying how many data objects or "records" are included in the Live Buffer object 100 (not shown in the depicted embodiment).

In certain embodiments, the schema identifier 106 may be specified in two parts. First, a UUID that uniquely identifies the record type or schema, followed by a prefixvarint encoded binary length of the object. By including such a length, which fields from the identified schema are included may be determined by reading known fields until as much data has been consumed as the binary length allows. If there is any remaining data for unknown fields, the end of the object may be found by advancing the stream by the number of remaining bytes in the length. If any part of the UUID or length are identified by the schema, they may be elided in the binary data. Accordingly, what fields are in an object, the order of the fields, and the means to encode them may be defined as needed based on the requirements or uses of a particular application or use of a Live Buffer system.

The Live Buffer object 100 also includes a field sequence 130 comprising an entry 132 corresponding to each field of the object (record) schema as defined by the object (record) schema identified by the schema identifier 106. Each entry, may, in turn, include a stream for the corresponding field or another type of entry for the field. When a stream as utilized as entry for a field, the stream for a field in the field sequence 130 may therefore include the serialized values for a field of the schema of the Live Buffer object 100, where the values are packed sequentially and encoded according to the same scheme (as has been noted, however, different streams may use different encodings for their respective values). In some embodiments, instead of including the sequence of values for the stream as the entry 132 for a field in the field sequence 130, the stream may include a pointer to the beginning of the sequence of field values for that field as the entry 132 in the field sequence 130.

In one embodiment, the beginning of a sequence of field values for a field are pointed to by relative pointers (e.g., a relative pointer to the sequence of values for the stream is included in the field sequence 130). By utilizing relative pointers multiple and complex Live Buffer objects may be easily concatenated without corrupting any addresses of any of the included Live Buffer objects. As an example, a pointer included as an entry 132 in the field sequence 130 for a field may be encoded as an 8 byte signed two's compliment integer in little endian to an address relative to the base address of the pointer.

The Live Buffer format may also support compressing field values for a stream into a single field value if all values for a particular field are the same values share the same value, or a set of unique values and identifiers if fields have, for instance, a relatively large binary representation with low cardinality. To facilitate such compression, there may be different types of streams that may utilized as entries 132 in the field sequence 130. The types of stream for an entry may be identified, for example, by a sequence of bits included in a field entry 132.

As but one example, a stream type may be identified by a two bit section of a byte every four streams of a field sequence. Thus, a stream type definition or stream flag entry included as a field entry 132 may be one byte long where each two bits of the stream type definition may indicate a type of stream corresponding to one of the four following field entries 132 that include streams. For example, the first two bits of a stream flag entry (e.g., bits 0 and 1) may define a type of stream of the first field entry 132 following, the second two bits (e.g., bits 2 and 3) may define a type of stream of the second field entry 132 following the stream flag entry, the third two bits (e.g., bits 4 and 5) may define a stream type of the third field entry following the stream flag entry and the fourth two bits (e.g., bits 6 and 7) may define a stream type of the fourth field entry following the stream flag entry. If there are any additional streams, another stream flag entry may be included after the fourth field entry, and so on.

According to some embodiments, the type of streams may be 1) a "Null" stream, 2) a "Const" stream, 3) a "Sequence" stream, and a 4) "Table" stream. To elaborate on these embodiments, a Null stream may be a stream that has no items or data. In this case, the entry 132 in the field sequence 130 for a Live Buffer 100 may be a two bit stream identifier identifying the stream type as a Null stream.

A Const stream may be a stream where all records included in the Live Buffer 100 share the same value for that field. Here, the entry 132 in the field sequence 132 may be the two bit stream identifier identifying the stream type as a Const stream along with the shared value itself. In other words, the shared value may be inlined directly in the corresponding entry 132 in the field sequence 130.

A Sequence stream may be a stream comprised of packed fields following one after another. Here, the entry 132 in the field sequence 132 in field sequence 130 may the two bit stream identifier identifying the stream type as a Sequence stream along with a pointer to the beginning of the sequence of values for the stream, as discussed above.

A Table stream may be a stream comprised of two separate portions. Each portion may be substantially equivalent to a sequence stream. The first portion may include a sequence of unique values for that field for all records included in the Live Buffer 100. The second portion includes a sequence of index values corresponding to each included record, where each index value is a reference to one of the sequence of values in the first portion of the Table stream. These index values can thus define the value for the field for the corresponding record by referencing that value in the first portion of the Table stream. A Table stream may be useful, for example, if fields values for records have a relatively large binary representation and low cardinality. As may be imagined, in these types of cases, when a large number of records are included in a Live Buffer significantly fewer bytes may be required to represent the field values for each of a set of records using such a Table stream relative to including the values themselves for each of the included records. For Table streams, the two bit stream identifier identifying the stream type as a Table stream along with a pointer to both portions of that Table stream may be included in the entry 132 (e.g., in the field sequence 130).

It may be useful here to briefly illustrate a Table stream. Referring for a moment to FIG. 1B then, a block diagram of an embodiment of a Live Buffer for a set of example person records is depicted. Area 180 of FIG. 1B enumerates a set of seven example "Person" data records representing people, each person record has one field (JobTitle) where the field values may have a relatively large binary representation with relatively low cardinality (e.g., three strings of "Software Engineer" "Manager" and "CEO"). Here, area 190 of FIG. 1B depicts a Live Buffer object 160 that can be used for representing the person records of area 180. The Live Buffer object 160 includes a header portion 192 that includes an identifier 196 for a type or schema of the records and a version of the object type (here Person object type, Version 1.0).

Live Buffer 160 also includes a field sequence 150 that may include an entry 152a including a count identifying how many records are included in the Live Buffer 160 (here seven), an entry 152b including a stream flag entry and an entry 152c corresponding to the (JobTitle) field of the schema (Person object type, Version 1.0) of the Live Buffer object. Here, field entry 152b is a stream flag entry defining that the first following field entry 152c includes a Table stream. The Table stream of field entry 152c includes a pointer 156a to a sequence 166 of unique values (e.g., the three strings of "Software Engineer" "Manager" and "CEO") for that field (JobTitle) encompassed by all data records included in the Live Buffer 160. The Table stream of field entry 152c also includes a pointer 156b to a sequence 168 of index values corresponding to each of the seven included records, where each index value is a reference to one of the sequence of values in the sequence 166 of unique values included in the Table stream. It will be noted herein that the arrows depicted here (e.g., from index 0 to "Software Engineer") are for illustrative purposes to indicate that the index 0 means the first value in the sequence of values 166, and not that any pointers themselves are necessarily included in the index values 168. As is illustrated, the example stream may have values that are large compared to their indices (the indices may be stored using a variable length integer format, reducing the size of each index to 1 byte when using LEB128 for the first 127 unique values), as well as redundancy in the values (low cardinality of the data). It will be understood from this example that many other implementations of tables (e.g., such as interleaving values and indices, or using pointers instead of a stream of indices) may be utilized and are fully contemplated by embodiments as disclosed herein.

As mentioned above, objects formatted according to embodiments of the Live Buffers format may be stored or transmitted according to a message format. It will be realized, however, that use of messages with Live Buffers or embodiments of the disclosed messaging formats are in no way necessary to realize the benefits of the Live Buffer format and that such message formats are given purely for context. In one embodiment then, a message format that may be used in association with a Live Buffer may include a message format having a preamble identifying the message as one including an object of the Live Buffer format, an identification of the version of the Live Buffer format and a relative pointer to the root object of the message.

FIG. 2 depicts a block diagram of one embodiment of a message format that may be used to store or transmit a Live Buffer. In the depicted embodiment, a message 200 may include a preamble 202, identifying the message as being in the Live Buffers format. For example, the preamble is a "magic" number identifying the binary data that is pointed to by the included pointer as being in the Live Buffers format. For example, this preamble may be the UTF-8 encoded characters "LEBUF", which is the following binary sequence—0x4C, 0x45, 0x42, 0x55, 0x46.

The message 200 may also include a version identifier 204 identifying the semantic version of the Live Buffers format being used (e.g., an encoded identifier identifying version 1.0.0). The message 200 then includes a pointer 206 to a root object (e.g., an object in the Live Buffer format 100) of the message 200. Pointer 206 may be a relative pointer as discussed. It will be noted here, that many other types of message format may be utilized in association with Live Buffers as disclosed, including, for example, messages that do not utilize a pointer to a root object, but simply has the root object in place of a pointer.

Figure 3:
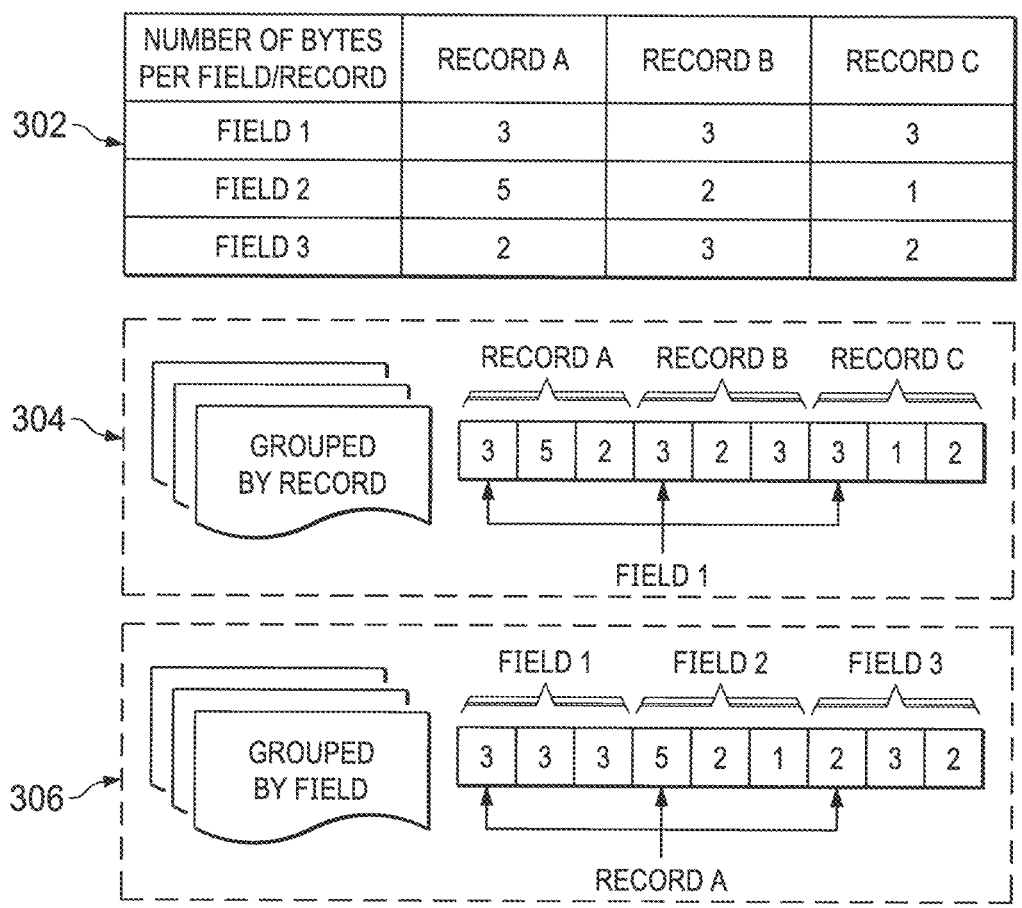
FIG. 3 is a diagrammatic representation of an example set of objects grouped by record and grouped by field.

It may now be useful to an understanding of embodiments as disclosed herein to discuss representations of particular examples. Looking then at FIG. 3, one embodiment of an example set of data records depicted grouped by record and grouped by field is depicted. For this example, table 302 indicates an example with three data records (Record A, Record B and Record C), each with three fields (Field 1, Field 2 and Field 3), where the values of the table indicate the number of bytes used for the field value for the respective field and record. Area 304 of FIG. 3 show the presentation of this example grouped by record while area 306 shows these fields grouped by field.

Figure 4:
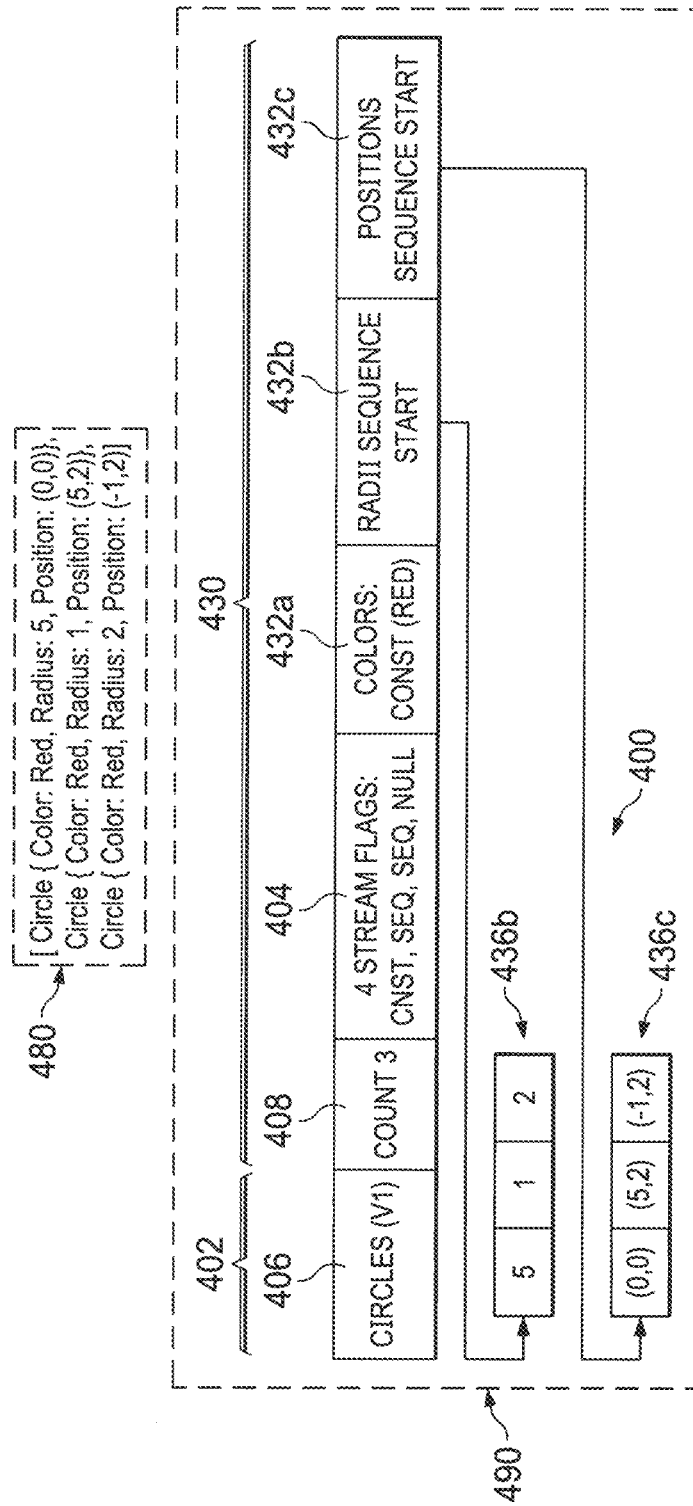
FIG. 4 is a diagrammatic representation of an example set of records and associated embodiment of an example data structure.

In FIG. 4, a block diagram of an embodiment of a Live Buffer for a set of example circle records is depicted. Area 480 of FIG. 4 enumerates a set of three example "Circle" data records representing circles, each circle record has three fields (color, radius, and position). Here, area 490 of FIG. 4 depicts a Live Buffer object 400 that can be used for representing the circle records of area 480. The Live Buffer object 400 includes a header portion 402 that includes an identifier 406 for a type or schema of the records and a version of the object type (here Circles object type, Version 1.0).

Live Buffer 400 also includes a field sequence 430 that may include a field including a count 408 identifying how many records are included in the Live Buffer 400 (here three), an entry 404 including a stream flag entry defining the types of streams of the following field entries, and an entry 432 corresponding to each field of the schema (Circles object type, Version 1.0) of the Live Buffer object (color, radius, and position). Here, entry 432a corresponds to a Const stream for the "Color" field with an inlined value of "Red". Entry 432b corresponds to a Sequence stream for the "Radius" field with a pointer to the beginning of the sequence 436b of field values for the "Radius" field as the entry 432b in the field sequence 430. Similarly, entry 432c corresponds to a Sequence stream for the "Position" field with a pointer to the beginning of the sequence 436c of field values for the "Position" field as the entry 432c in the field sequence 430.

Accordingly, by splitting the grouping of the circle list into its own object and grouping the fields into their own streams the cost of versioning information may be amortized across the list of all circles and the problem that variable length fields would interfere with the positions of fields of a different type within a single circle may be removed. As discussed, as long as an encoding is able to advance a pointer in the stream by the number of bits that a field of a known type takes then it is possible to know where the next field of a record resides.

Figure 5:
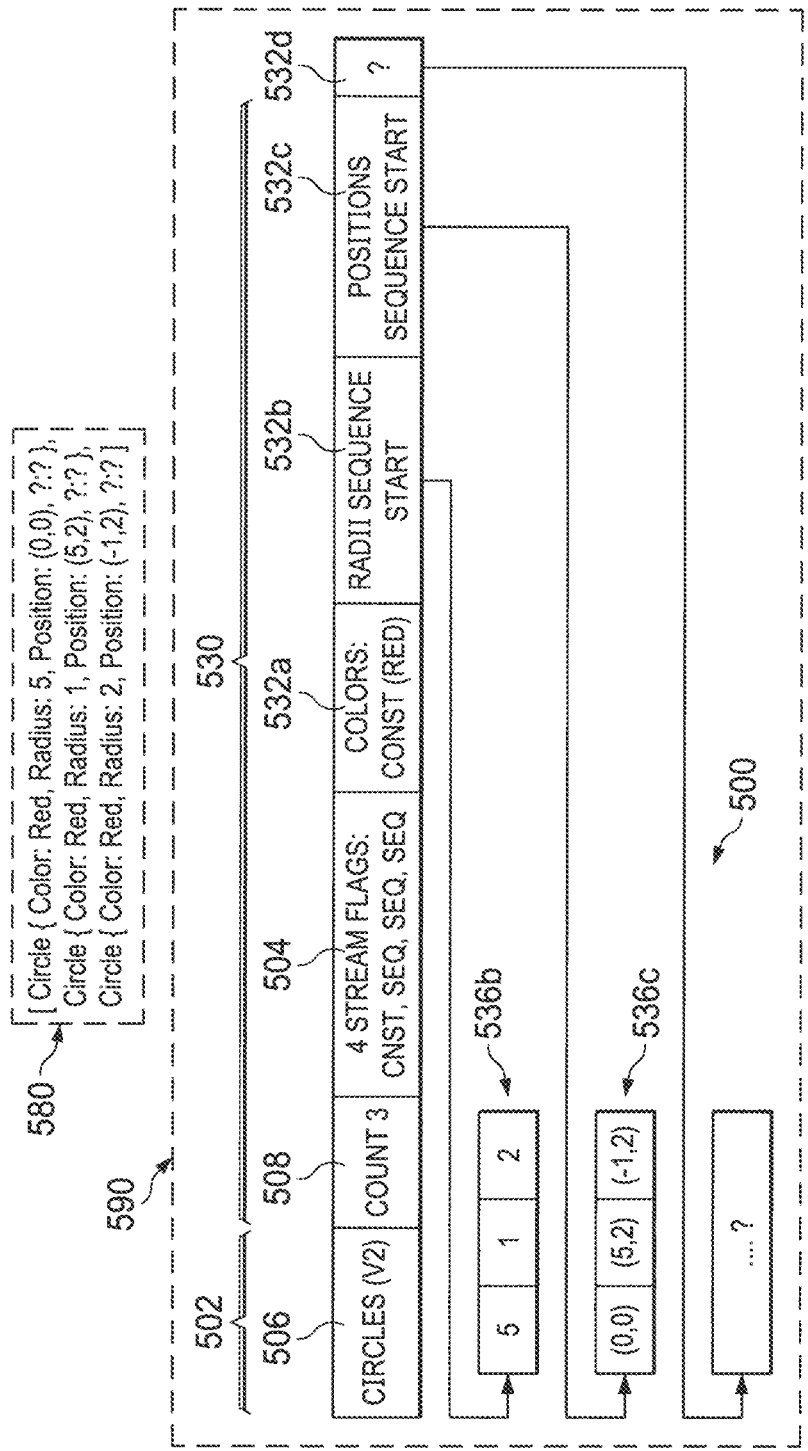
FIG. 5 is a diagrammatic representation of an example set of records and associated embodiment of an example data structure including additional fields that may be unknown to a decoder.

Moving to FIG. 5, a block diagram of an embodiment of a Live Buffer for a set of example circle records is depicted. Continuing with the example of circles depicted in FIG. 4, imagine a second version of the circles schema (Version 2.0) where one or more additional fields (represented by "?") have been added to the Circles schema. FIG. 5 depicts how the set of circle records shown in area 580 would be serialized in the Live Buffers format and interpreted by an application or other software that implements, utilizes or is otherwise adapted to interpret Version 1 of the circle schema (e.g., as shown in in FIG. 4).

Here, area 590 of FIG. 5 depicts a Live Buffer 500 representing the circle records of area 580. The Live Buffer object 500 includes a header portion 502 that includes an identifier 506 for a type or schema of the records and a version of the object type (here Circles object type, Version 2.0).

Live Buffer 500 also includes a field sequence 530 comprising a count 508 identifying how many records are included in the Live Buffer object 500 (here three), an entry 504 including a stream flag entry defining the types of streams of the following field entries, and an entry 532 corresponding to each field of the schema (Circles Version 2.0) for the Live Buffer object (color, radius, position and new field ("?")). As in the example of FIG. 4, entry 532a corresponds to a Const stream for the "Color" field with an inlined value of "Red". Entry 532b corresponds to a Sequence stream for the "Radius" field with a pointer to the beginning of the sequence 536b of field values for the "Radius" field as the entry 532b in the field sequence 530. Similarly, entry 532c corresponds to a Sequence stream for the "Position" field with a pointer to the beginning of the sequence 536c of field values for the "Position" field as the entry 532c in the field sequence 530. Additionally, entry(s) 532d may include one or more entries corresponding to streams for the additional fields included in Version 2.0 of the Circles schema. It will be noted here, that should another stream be introduced (e.g., in a subsequent version of the "Circles" schema), another stream flag entry would be included a Live Buffer according to that schema after the "?" field entry 532d in embodiments where the stream flags are stored as two bits of a byte such that one byte represented four flags for four corresponding streams.

As can be seen from the depicted example, the process for finding all Version 1.0 circle data is unchanged, even though there is no per object binary representation of how to skip over the data of an unknown type. Thus, an application or other software that implements, utilizes or is otherwise adapted to interpret Version 1 of the circle schema may not need to be altered, despite the alteration to the Circle schema itself. This ability may be contrasted with previous approaches to the serialization and deserialization of records where fields may have been interleaved in the binary format, where it would not be possible to skip over the unknown data to find the beginning of the next field of the same type for the record list.

Accordingly, the ability to add new fields to a schema and include such fields in the Live Buffer format enables backward compatibility–that is, software with knowledge of an older schema can understand records serialized by software using a newer version of the schema. Similarly, the inclusion of an identifier for a type or schema of the record and a version of the object type (e.g., Circles object type, Version 2.0) in the Live Buffer format may enable forward compatibility as well.

Moreover, it can be observed that a Live Buffer object field can be any encoded field, including the kind using a custom encoder. By way of example, in FIG. 5 the collection of Circles may have a field called "Group Name" which could have the value "My Group Name" or a "Bounding Box" field which was the bounding box of all the circles in the group accounting for their positions and radii. This is distinct from a const stream, which (in the array of records transformation examples as depicted herein) would mean each circle has a "Group Name" or "Bounding Box" but that the value applies to the group.

As another observation, the Live Buffer format may allow for conditional stream reads. As discussed above, because a count is not a part of the header of the Live Buffer object, application logic can use additional data to determine whether to read from a stream. By way of example, polymorphism could be achieved in the Circles example above by having a stream of "Type" where the values are, say, 0 for Circle and 1 for Square. If the value is 0, data from the Radii stream may be used, while if the value is 1, data from the Width and Height stream may be used, but both Circle and Square would both pull off of the Position and Color streams because that's a part of the polymorphic Shape base-class. Another example that could be used, for instance, for geospatial data is this—there is an Altitude Mode stream for the positions of entities on the globe. The possible values are Snap To Ground (e.g., a bus on a road), Relative to Mean Sea Level (e.g., a trans-Atlantic flight), and Relative to Ground (e.g., a drone which hovers over a road). If the value is Snap To Ground, an application may not use a value off of the Altitude Stream. This results in significant reduction to the binary size in some contexts that may utilize such geospatial data.

It may now be useful to an understanding of embodiments to discuss a computer network environment including a geospatial information system where embodiments of the Live Buffer format as discussed may be usefully employed. It will be understood that the description of such geospatial information systems and their use are provided by way of example, and are not intended to serve as limitations or constraints on the implementation or use of embodiments of the systems and methods for data formats and structures disclosed herein. Generally, then, the embodiments of the systems and methods for data formats and structures as disclosed, including the Live Buffer format, may be usefully applied in almost any computing environment where data (e.g., on records or entities) may be utilized, stored or transmitted with the commensurate advantages as discussed.

Figure 6A:
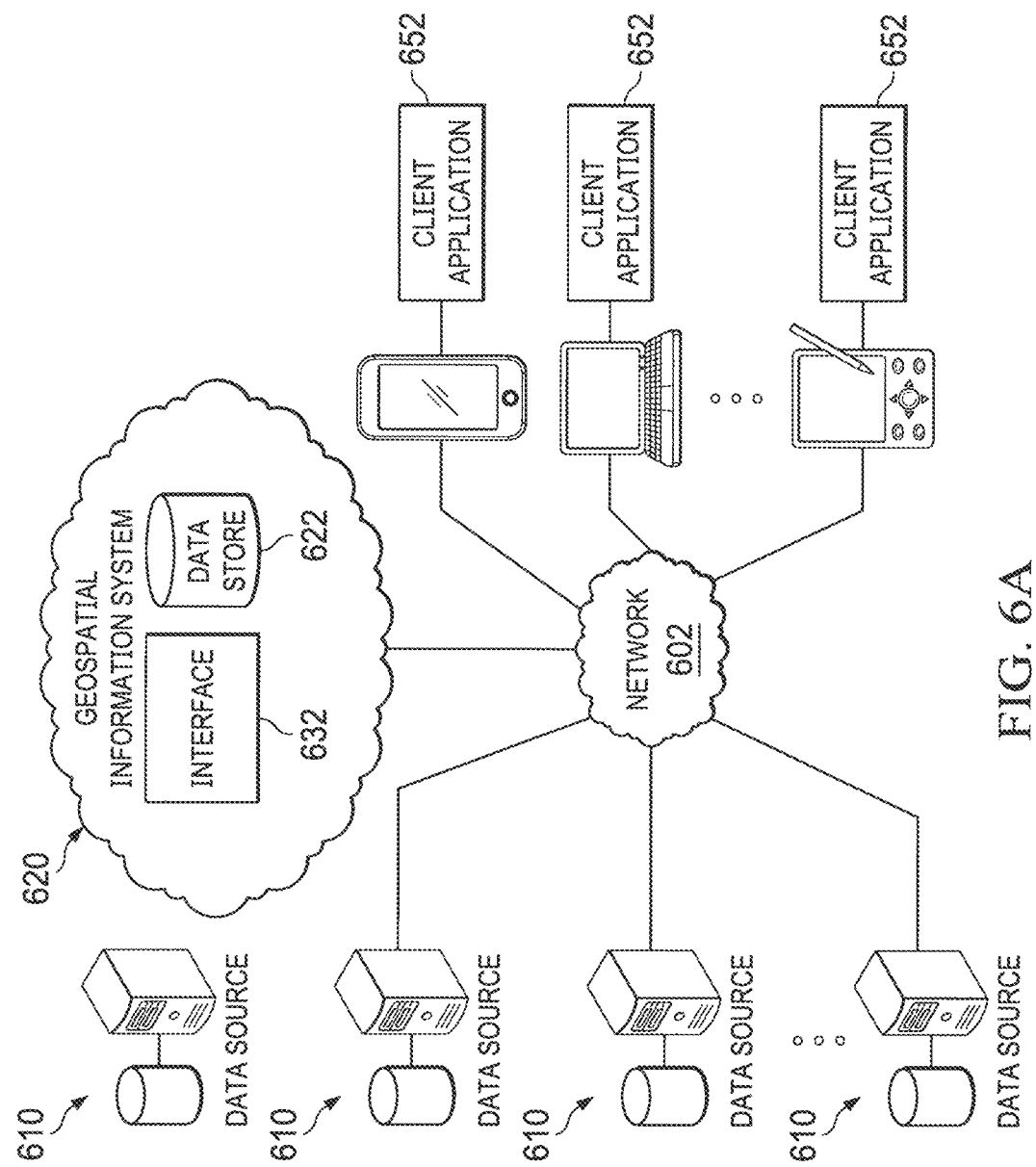
FIG. 6A is a diagrammatic representation of an architecture including a geospatial information system that may utilize the Live Buffer format.

With reference to FIG. 6A, then, geospatial information system 620 may compile geospatial information including geospatial locations from multiple, disparate sources 610 over network 602 which may be the Internet, an intranet, a cellular network, another type of wireless or wired network or some combination of these types of networks. As discussed, these information sources 610 may include data sources associated with weather monitors, traffic devices (e.g., air traffic, road traffic, marine traffic, etc.), devices for delivery fleets, devices related to lighting, parking, water flow for bodies of water or city utilities, seismographic data, computing devices, video cameras, devices monitoring building status, or a whole host of other entities, devices or systems. The geospatial information obtained from the geospatial data information sources 610 can be stored in data store 622 maintained by the geospatial information system 620.

The geospatial information in the data store 622 or associated data can then be provided to various other entities that require geospatial information for their operation over network 602 through, for example, a service or other type of interface 632. As but one example, a client application 652, that may be a thin client application, a thick client application, a web-based application or another type of application, may request or receive certain geospatial location data through the interface 632 of geospatial information system 620. The geospatial information system 620 may obtain the requested geospatial location data and return it to the requesting client application 652 through the interface 632, where the client application 652 may use the geospatial locations or other geospatial data to, for example, present an interface to a user.

Figure 6B:
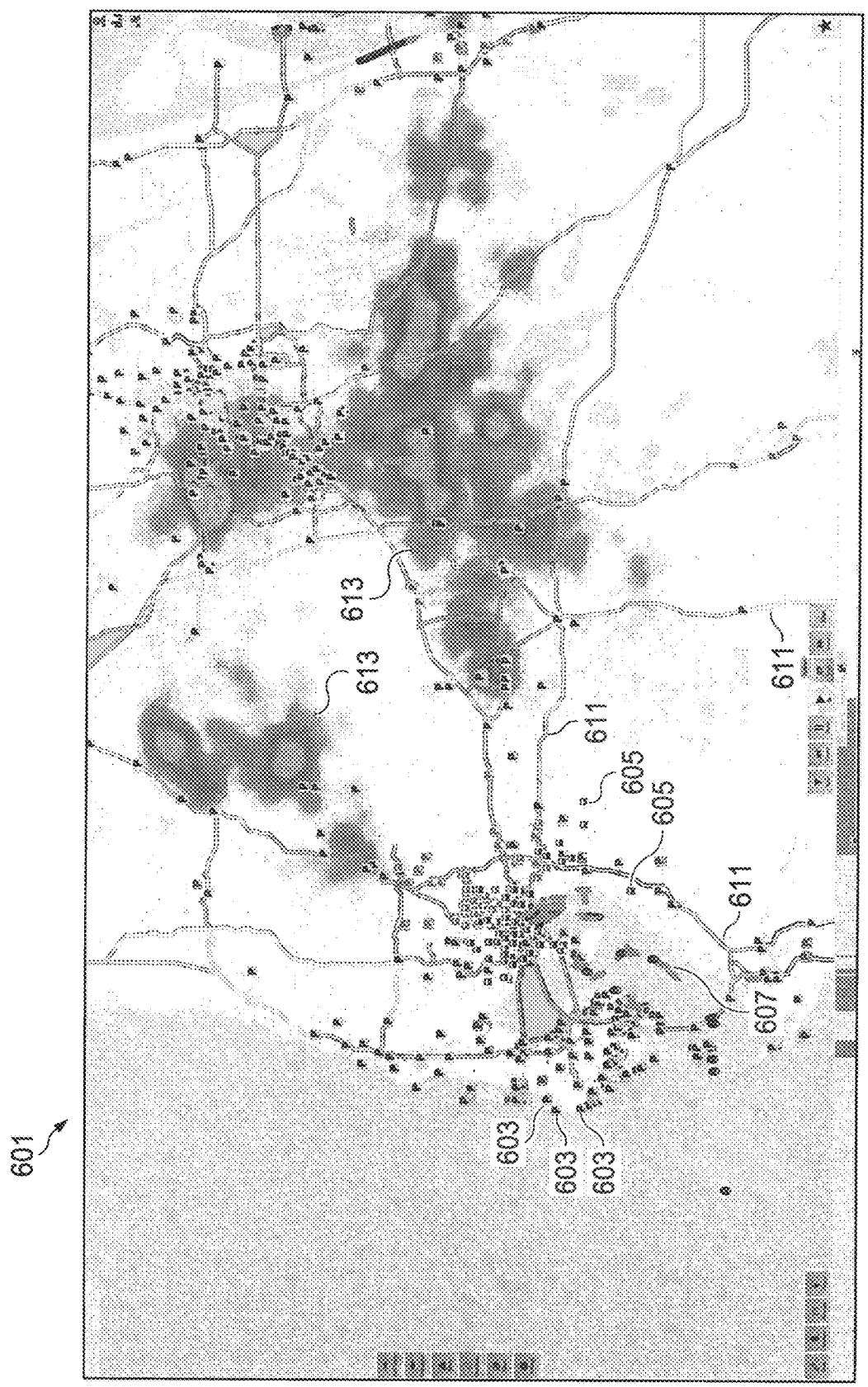
FIG. 6B is a depiction of an interface that may be utilized with embodiments of a geospatial information system.

Referring briefly to FIG. 6B, one embodiment of just such an interface is depicted. This interface 601 depicts a geographical area with a set of icons representing various entities, where each of these entities is associated with a geospatial location. Thus, here, a client application 652 may request geospatial data on a set of specified entities in a specified geographical area and geospatial information system 620 can return geospatial data on these entities to the requesting client application 652 (or such geospatial data may be sent from geospatial information system at a regular time interval, etc.), including the geospatial location associated with each of the specified entities. The client application 652 can then render the interface 601 to present to the user at the user's device. The interface 601 may depict the geographical area and an icon for each of the specified entities where the icon for the presented entity may be displayed relative to the depicted geographical area at the corresponding geospatial location. The various entities may also be depicted in other manners (e.g., other than individual icons), such as a heat or distribution map, etc.

In the instant example, the specified set of entities may include parking lots, lightning strikes, busses, ships and traffic flows. The geospatial data on these specified entities determined by the geospatial information system 620 (and provided to the client application 652) may be different per each entity type (or even individual entities) and may include, for example, data on an icon used to represent the entity in the interface, a geospatial location (e.g., position) of the entity, a heading (e.g., a direction of movement), a timestamp (e.g., at which the data was determined or received about the entity) or other attributes for an entity. It will be noted that additionally, the geospatial data returned for an entity (or set of entities) may be different, or include more or less geospatial data, based on the manner in which the entity (or set of entities) is to be displayed through the interface (e.g., which may be specified by the client interface 652 in a request for geospatial data on the specified entities). Moreover, the type or amount of geospatial data provide by geospatial information system 620 for each entity may be different (even with respect to the same entity) at different points based on a number of criteria.

Continuing with this example, for parking lot entities, the geospatial information system 620 may include geospatial data on an icon that may be variable per event or specific to the entity (e.g., based on how full the parking lot is), the position (e.g., the geospatial location) that may be variable per entity, and a timestamp that can be variable per the event. For lightning strikes, the geospatial information system 620 may include geospatial data on an icon that may be variable per event or specific to the entity, the position (e.g., the geospatial location where the lighting strike occurred) may be variable per entity, and a timestamp that can be variable per the event. For busses the geospatial information system 620 may include geospatial data on an icon that may be fixed, the position (e.g., the geospatial location of the bus) that may be variable per event, and a timestamp that can be variable per the event. For ships, the geospatial information system 620 may include geospatial data on an icon that may be variable per entity, the position (e.g., the geospatial location) that may be variable per event, a heading that may be variable per event, and a timestamp that can be variable per the event. For traffic flows, the geospatial information system 620 may include geospatial data on the map of roads (e.g., where roads segments are, attributes associated with a road such as the road name, or other information) and temporal data on the speeds of traffic on the roads.

As can be seen then, the transmission of data on different entities (e.g., parking lots, lighting, busses, ships, traffic flows, etc.), may require different types of data for each entity, where that data may itself be variable. Thus, in other binary serialization formats it may be necessary to employ different schemas for the serialization and deserialization of each of these entities. In contrast, as the Live Buffer format may provide a packed sequence that may include fields of varying types and encodings with an order determined by the schema of that particular type of Live Buffer object, embodiments of the Live Buffer format may be ideally suited for use in such a context by allowing the use of different streams tailored to the encoding of that data. For example, the depiction of lighting as a heatmap (e.g., as opposed to depicting the individual strikes) may require additional streams for the requested attributes at a per event granularity. The Live Buffer format may allow the schema (e.g., for lightning) to include the efficient addition of dynamic and self-describing attribute streams, without the cost usually associated with that kind of functionality.

To illustrate in more detail, certain other binary serialization formats (e.g., protobuf) may not have functionality for de-duplicating values of fields across multiple entities like the use of the multiple types of streams of the Live Buffer format (e.g., a Const or Table stream) does. As discussed above, different kinds of entities have different levels of variance for the same data (e.g., an icon used may vary not at all for an entire feed like buses, or may vary per entity like ships, or vary per event like parking). In particular serialization formats (e.g., protobuf) a schema which enables the highest amount of variance may be used at a loss of efficiency because of the lack of de-duplication. In protobuf then, it may be desirable to create more schemas, but to do so incurs a significant added cost in terms of engineering time (especially considering all the possible permutations of variance per data across multiple fields). According to embodiments of the Live Buffers format, however, rather than create a new schema an encoder may simply utilize different kinds of streams as is appropriate for the data it is encoding. In this way, by employing the Live Buffers format the efficiency of a custom schema is realized without the engineering effort. Concretely, it is possible for Live Buffers to express, for example, "all the buses share the same icon" (const stream), "the ships use a limited set of highly redundant icons" (table stream), or "parking icons are highly variable" (sequence stream) without the need to create additional schemas.

As another example, with respect to traffic flows, two separate Live Buffer schemas may be used for streaming parts of the data independently. One schema may be used for speeds, and one schema for the map (e.g., the location of the roads segments and what attributes they have, such as road names). As road names and other attributes for roads are shared across many road segments in a region, the use of a table stream in such a schema may provide especially efficient.

Thus, based on the geospatial data returned by the geospatial information system 620 the client interface 652 may render the interface 601. This interface 601 may include icons 603 for parking lot entities where those icons 603 are depicted at their corresponding geospatial location with respect to the depicted geographic area. Similarly, the interface may include icons 605 for busses and icons 607 for ships, each icon 605, 607 depicted at their corresponding geospatial location with respect to the depicted geographic area. The interface 601 may also include roads 611 depicted at their geospatial location, where the roads 611 may be depicted with some indication of the speed of traffic on those roads 611 (e.g., by depicting the roads 611 in a color indicative of the speed of traffic). In this example, instead of depicting individual lightning strikes in the example interface 601 a "heat map" of lightning strikes is depicted based on the geospatial locations of the entire set of lightning strikes occurring in the geographical area (e.g., within a previous time period). This heat map 613 may be a graphical representation of the lightning strike events, where the individual lighting strike events or a concentration of the lightning strike events are represented as colors. Such a heat map may be, for example, a visualization of a density function applied to the lightning strike events.

As but one illustration of the efficacy of the Live Buffer format, using the Live Buffer format to transmit the geospatial data for use in rendering the interface 601 between a geospatial information system and a client device, the entire scene of interface 601 was downloaded and rendered in less than one second on a commodity internet connection and commodity computing hardware. It can therefore by understood how utilizing the different streaming formats available in embodiments of the Live Buffer format (e.g., Const, Sequence, Table, Null) for different feeds or data enables the schema to adapt and be efficient in a variety of different scenarios (e.g., as described above) even in instances where only a single schema is used. It will also be understood how the clustered nature of real data (both in time, location, and additional dimensions) allows for delta compression (which may require variable length encodings) over a sequence stream or similar to achieve optimal compression in a variety of scenarios using embodiments of the Live Buffer format disclosed herein.

These, and other, aspects of the disclosure and various features and advantageous details thereof are explained more fully with reference to the exemplary, and therefore non-limiting, embodiments illustrated and detailed in the accompanying appendices. It should be understood, however, that the detailed description and the specific examples, while indicating the some embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive subject matter will become apparent to those skilled in the art from this disclosure, including the accompanying appendices.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, Python, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a non-transitory computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

What is claimed is:

1. A system, comprising:
   a processor; and
   a memory comprising a data structure for serializing data from data records representing a type of real-world entity, wherein the data representing an entity in an associated data record includes geospatial information associated with a geographic location of the entity, the data structure adapted for use in providing the serialized data from the data records representing real-world entities to requestors to allow dynamic tracking of those real-world entities, the data structure including:
      a header portion comprising:
         a schema identifier for a schema for the data records representing the type of entity, wherein the schema defines a number of fields for the type of the entity and an encoding of each of the fields to be used for that field in the data structure, and
         a version identifier identifying a version of the schema; and
      a field sequence portion, comprising multiple streams defining a series of entries corresponding to each of the fields defined by the schema, each entry of the field sequence portion including serialized values from the data records for a corresponding one of the fields for the type entity and including a stream for the corresponding one of the fields that includes serialized values for the corresponding one of the fields from the data records, such that each value for the corresponding one of the fields from each data record representing the type of entity are all included in that entry and are encoded in the stream according to the encoding defined by the schema identified by the schema identifier, and such that each stream is one of a Table stream, a Null stream, a Sequence stream or a Const stream, the Table stream providing compression of data in the field sequence portion by including a first sequence of unique values, and a second sequence of indices into the unique values indicating an order of occurrence in the first sequence, the Sequence stream providing compression of data in the field sequence portion by including a pointer to a buffer of the series using homogeneous encodings, and the Const stream including a single field value, the Const stream providing compression of data in the field sequence portion by deduplication, by indicating that all data records have a same single field value for the corresponding field.

2. The system of claim 1, wherein the streams are encoded according to different schemas.

3. The system of claim 1, wherein the field sequence portion includes a stream flag entry identifying a type of each stream.

4. The system of claim 3, wherein at least one of the streams includes a pointer to a relative address corresponding to the serialized values of that stream.

5. The system of claim 3, wherein the schema identifier comprises a universally unique identifier (UUID) and a binary length of the data structure.

6. The system of claim 5, wherein the field sequence portion includes a count of the number of data records included in the data structure.

7. A method for the serialization of data records, comprising:
   obtaining data records representing a type of real-world entity, wherein the data representing an entity in an associated data record includes geospatial information associated with a geographic location of the entity;
   serializing data from the data records for the type of entity, wherein serializing the data from the data records comprises generating a data structure adapted for use in providing the serialized data from the data records representing real-world entities to requestors to allow dynamic tracking of those real-world entities, the data structure including:
      a header portion comprising:
         a schema identifier for a schema for the data records representing the type of entity, wherein the schema defines a number of fields for the type of the entity and an encoding of each of the fields to be used for that field in the data structure, and
         a version identifier identifying a version of the schema; and
      a field sequence portion, comprising multiple streams defining a series of entries corresponding to each of the fields defined by the schema, each entry of the field sequence portion including serialized values from the data records for a corresponding one of the fields for the type entity and including a stream for the corresponding one of the fields that includes serialized values for the corresponding one of the fields from the data records, such that each value for the corresponding one of the fields from each data record representing the type of entity are all included in that entry and are encoded in the stream according to the encoding defined by the schema identified by the schema identifier, and such that each stream is one of a Table stream, a Null stream, a Sequence stream or a Const stream, the Table stream providing compression of data in the field sequence portion by including a first sequence of unique values, and a second sequence of indices into the unique values indicating an order of occurrence in the first sequence, the Sequence stream providing compression of data in the field sequence portion by including a pointer to a buffer of the series using homogeneous encodings, and the Const stream including a single field value, the Const stream providing compression of data in the field sequence portion by deduplication, by indicating that all data records have a same single field value for the corresponding field.

8. The method of claim 7, wherein the streams are encoded according to different schemas.

9. The method of claim 7, wherein the field sequence portion includes a stream flag entry identifying a type of the streams.

10. The method of claim 9, wherein at least one of the streams includes a pointer to a relative address corresponding to the serialized values of that stream.

11. The method of claim 9, wherein the schema identifier comprises a universally unique identifier (UUID) and a binary length of the data structure.

12. The method of claim 11, wherein the field sequence portion includes a count of the number of data records included in the data structure.

13. A non-transitory computer readable medium comprising instructions for the serialization of data records, comprising instructions for:
  obtaining data records representing a type of real-world entity, wherein the data representing an entity in an associated data record includes geospatial information associated with a geographic location of the entity;
  serializing data from the data records for the type of entity, wherein serializing the data from the data records comprises generating a data structure adapted for use in providing the serialized data from the data records representing real-world entities to requestors to allow dynamic tracking of those real-world entities, the data structure including:
  a header portion comprising:
    a schema identifier for a schema for the data records representing the type of entity, wherein the schema defines a number of fields for the type of the entity and an encoding of each of the fields to be used for that field in the data structure, and
    a version identifier identifying a version of the schema; and
  a field sequence portion, comprising multiple streams defining a series of entries corresponding to each of the fields defined by the schema, each entry of the field sequence portion including serialized values from the data records for a corresponding one of the fields for the type entity and including a stream for the corresponding one of the fields that includes serialized values for the corresponding one of the fields from the data records, such that each value for the corresponding one of the fields from each data record representing the type of entity are all included in that entry and are encoded in the stream according to the encoding defined by the schema identified by the schema identifier, and such that each stream is one of a Table stream, a Null stream, a Sequence stream or a Const stream, the Table stream providing compression of data in the field sequence portion by including a first sequence of unique values, and a second sequence of indices into the unique values indicating an order of occurrence in the first sequence, the Sequence stream providing compression of data in the field sequence portion by including a pointer to a buffer of the series using homogeneous encodings, and the Const stream including a single field value, the Const stream providing compression of data in the field sequence portion by deduplication, by indicating that all data records have a same single field value for the corresponding field.

14. The non-transitory computer readable medium of claim 13, wherein the streams are encoded according to different schemas.

15. The non-transitory computer readable medium of claim 13, wherein the field sequence portion includes a stream flag entry identifying a type of the streams.

16. The non-transitory computer readable medium of claim 15, wherein at least one of the streams includes a pointer to a relative address corresponding to the serialized values of that stream.

17. The non-transitory computer readable medium of claim 15, wherein the schema identifier comprises a universally unique identifier (UUID) and a binary length of the data structure.

18. The non-transitory computer readable medium of claim 17, wherein the field sequence portion includes a count of the number of data records included in the data structure.

* * * * *